US012763224B2

(12) United States Patent
Pillard et al.

(10) Patent No.: US 12,763,224 B2
(45) Date of Patent: Oct. 13, 2026

(54) METHOD OF REPLACING A FUNCTIONALITY OF A THERMAL SHIELD FLEXURE, A THERMAL SHIELD FLEXURE MEMBER, AND A SYSTEM INCLUDING THE SAME

(71) Applicant: Westinghouse Electric Company LLC, Cranberry Township, PA (US)

(72) Inventors: Mark Michael Pillard, Gurnee, IL (US); Matthew James Palamara, Butler, PA (US); Stephen Daniel Smith, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 660 days.

(21) Appl. No.: 17/904,132

(22) PCT Filed: Feb. 10, 2021

(86) PCT No.: PCT/US2021/017483
§ 371 (c)(1),
(2) Date: Aug. 12, 2022

(87) PCT Pub. No.: WO2021/163211
PCT Pub. Date: Aug. 19, 2021

(65) Prior Publication Data

US 2023/0136152 A1 May 4, 2023

Related U.S. Application Data

(60) Provisional application No. 62/975,957, filed on Feb. 13, 2020.

(51) Int. Cl.
*G21C 11/08* (2006.01)

(52) U.S. Cl.
CPC .................................. *G21C 11/08* (2013.01)

(58) Field of Classification Search
CPC ............................ G21C 11/08; F16B 2200/50
(Continued)

(56) References Cited

U.S. PATENT DOCUMENTS 4,652,418 A 3/1987 Baric et al.
4,849,158 A 7/1989 Meuschke et al.
(Continued)

FOREIGN PATENT DOCUMENTS

CN 107369482 B 4/2019
EP 0327056 A2 8/1989
(Continued)

OTHER PUBLICATIONS

International Search Report and Written Opinion for International PCT Application No. PCT/US2021/017483, dated Apr. 30, 2021.
(Continued)

*Primary Examiner* — Jinney Kil
(74) *Attorney, Agent, or Firm* — K&L Gates LLP

(57) ABSTRACT

A thermal shield flexure member. The thermal shield flexure member includes a first face portion, a second face portion and a third portion. The first face portion defines openings configured to align with receptacles of a thermal shield. The second face portion defines openings configured to align with openings of a core barrel and openings of an arm portion of a modified thermal shield flexure connected to the core barrel. The third portion is connected to the first face portion and the second face portion, and comprises a radiused portion. The thermal shield flexure member is configured to provide flexibility in an axial direction to accommodate differential axial expansions of the core barrel and the thermal shield, and rigidity in a radial direction to inhibit undesirable shell mode vibrations of the core barrel and/or the thermal shield.

8 Claims, 11 Drawing Sheets

(58) Field of Classification Search
USPC .................................. 376/287, 289; 403/282
See application file for complete search history.

(56) References Cited

U.S. PATENT DOCUMENTS

| | | | | |
|---|---|---|---|---|
| 5,259,010 | A | 11/1993 | Brown et al. | |
| 7,813,464 | B1 | 10/2010 | Harkness | |
| 8,615,065 | B2 | 12/2013 | Balog | |
| 10,760,603 | B2 | 9/2020 | Welsh et al. | |
| 2011/0096890 | A1 | 4/2011 | Balog | |
| 2014/0294494 | A1 * | 10/2014 | Corden .............. | A47B 47/0083<br>403/345 |

FOREIGN PATENT DOCUMENTS

| | | | |
|---|---|---|---|
| JP | H01227994 | A | 9/1989 |
| JP | H04318494 | A | 11/1992 |
| JP | 2000137089 | A | 5/2000 |
| TW | 201535413 | A | 9/2015 |
| WO | 2021163211 | A1 | 8/2021 |

OTHER PUBLICATIONS

Lubin et al., Analysis of internals vibration monitoring and loose part monitoring systems data related to the St. Lucie 1 thermal shield failure, Progress in Nuclear Energy, Pergamon Press, Oxford, GB (Jan. 1, 1988), 117-126.
Search Report for corresponding Taiwan Patent Application No. 111133447, dated Jul. 25, 2023.

* cited by examiner

METHOD OF REPLACING A FUNCTIONALITY OF A THERMAL SHIELD FLEXURE, A THERMAL SHIELD FLEXURE MEMBER, AND A SYSTEM INCLUDING THE SAME

CROSS-REFERENCE TO RELATED APPLICATIONS

This application is a U.S. National Stage Entry under 35 U.S.C. § 371 of International Patent Application No. PCT/US2021/017483, entitled METHOD OF REPLACING A FUNCTIONALITY OF A THERMAL SHIELD FLEXURE, A THERMAL SHIELD FLEXURE MEMBER, AND A SYSTEM INCLUDING THE SAME, filed Feb. 10, 2021, which claims the benefit under 35 U.S.C. § 119(e) U.S. Provisional Patent Application No. 62/975,957 filed Feb. 13, 2020, titled METHOD OF REPLACING A FUNCTIONALITY OF A THERMAL SHIELD FLEXURE, A THERMAL SHIELD FLEXURE MEMBER, AND A SYSTEM INCLUDING THE SAME, the entire disclosures of which are hereby incorporated by reference herein.

BACKGROUND

In certain pressurized water reactors, a plurality of thermal shield flexures are utilized to connect a core barrel to a thermal shield at multiple positions around a circumference of a reactor vessel. A top view of exemplary thermal shield flexure locations around a circumference of a reactor vessel is shown in FIG. 1. As the core barrel and the thermal shield are geometrically different and vary in proximity to the fuel, the core barrel and the thermal shield can expand axially and radially at different rates. One function of the thermal shield flexures is to provide flexibility in the axial direction to accommodate the differential axial expansion of the core barrel and the thermal shield. Another function of the thermal shield flexures is to provide rigidity in the radial direction to inhibit undesirable shell mode vibrations of the core barrel and the thermal shield.

For such pressurized water reactors, the thermal shield flexures are generally T-shaped members having an arm portion (the top portion of the T-shape) and a stem portion (the vertical portion of the T-shape). For each thermal shield flexure, the arm portion of the thermal shield flexure is positioned against an interior surface of the core barrel and the stem portion of the thermal shield flexure extends radially outward from the arm portion, through the core barrel and to the thermal shield. The arm portion is secured to the core barrel by a plurality of bolts which pass from an exterior surface of the core barrel, through corresponding openings of the core barrel, and into corresponding receptacles defined by the arm portion of the thermal shield flexure. For the exemplary thermal shield flexure shown in FIG. 2, there are eight bolts which collectively secure the arm portion of the thermal shield flexure to the core barrel—four of the eight bolts are positioned “above” the stem portion of thermal shield flexure and the other four of the eight bolts are positioned “below” the stem portion of thermal shield flexure. The stem portion of the thermal shield flexure is secured to the thermal shield by a welded joint and can also be welded to the arm portion of the thermal shield flexure by a welded joint (See FIG. 2).

The thermal shield flexures are installed during the construction of the pressurized water reactor, before the pressurized water reactor becomes operational. Over time, due to thermal expansion of the core barrel and the thermal shield, as well as vibration of the core barrel, it may be possible for one or more of the welded joints to degrade or even fail, thereby potentially impacting the desired functionality of the thermal shield flexures. Given that the respective arm portions of the thermal shield flexures are positioned interior to the core barrel, replacement of any one of the thermal shield flexures with the same type of thermal shield flexure can require a significant field effort (schedule and cost). What is needed is a different thermal shield flexure which can be utilized to replace the functionality of any one of the above-described thermal shield flexures, and can be installed without welding and from the outside of the core barrel.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
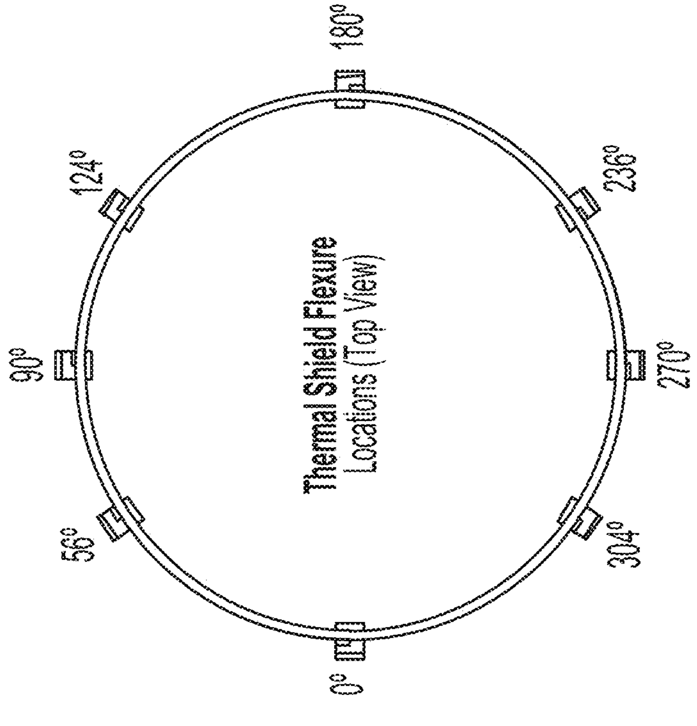
FIG. 1 illustrates a top view of exemplary thermal shield flexure locations around a circumference of a reactor vessel.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the thermal shield flexure member in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the thermal shield flexure member disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, top, below, floor, left, right, side, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Figure 3:
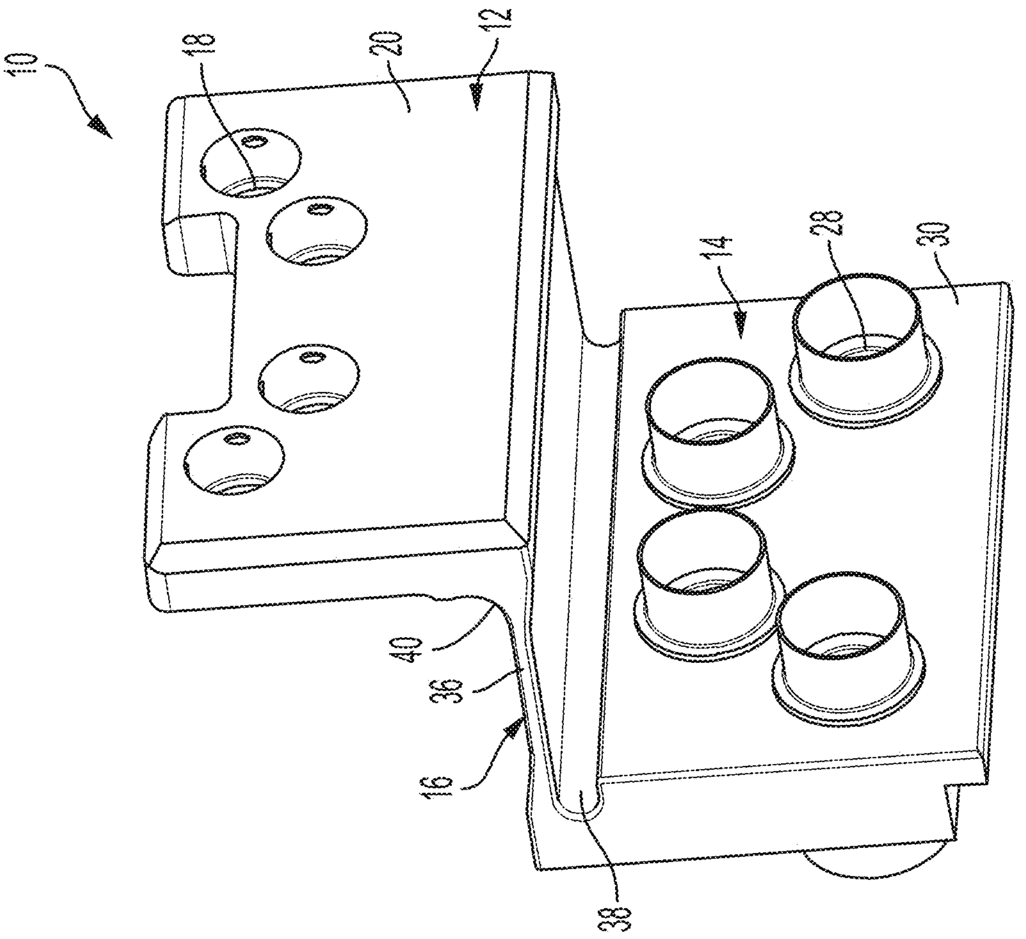
FIG. 3 illustrates a front view of a thermal shield flexure member, in accordance with at least one aspect of the present disclosure.
Figure 4:
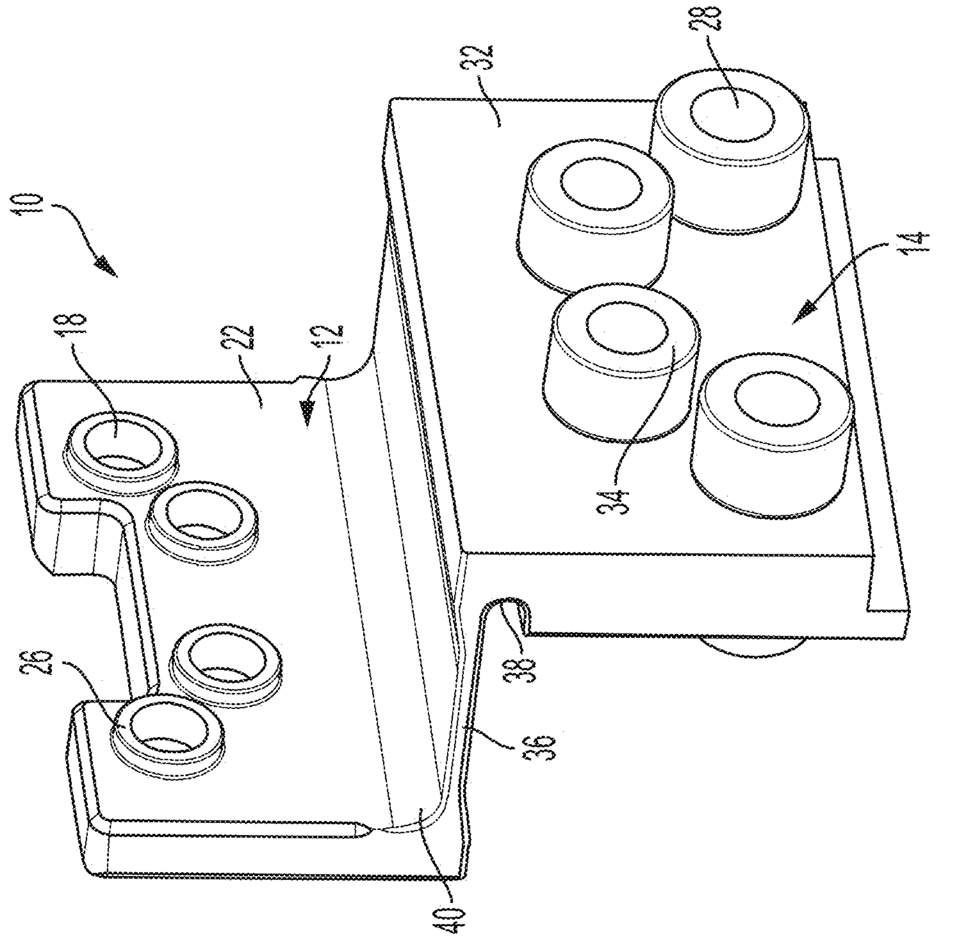
FIG. 4 illustrates a rear view of the thermal shield flexure member of FIG. 3, in accordance with at least one aspect of the present disclosure.

FIG. 3 illustrates a front view of a thermal shield flexure member 10 in accordance with at least one aspect of the present disclosure, and FIG. 4 illustrates a rear view of the thermal shield flexure member 10 in accordance with at least one aspect of the present disclosure. The thermal shield flexure member 10 can be utilized as a "replacement" for one of the thermal shield flexures described above. The thermal shield flexure member 10 includes a first face portion 12, a second face portion 14, and a third portion 16 connected to the first and second face portions 12, 14. For the exemplary aspects shown in FIGS. 3, and 5, the third portion 16 generally exhibits thickness changes and radii near the transitions into the first face portion 12 and the second face portion 14. According to various aspects, the third portion 16 is formed integral with the first and second face portions 12, 14.

The first face portion 12 defines a plurality of openings 18 which pass through the first face portion 12, from a first side 20 of the first face portion 12 to a second side 22 (See FIG. 4) of the first face portion 12. Although four of the openings 18 are shown in FIG. 3, according to other aspects, the number of openings 18 can be less than or greater than four. Each of the openings 18 are countersunk on the first side 20. According to various aspects, each of the openings 18 include recesses 24 (See FIG. 8) machined into the sidewall of the opening 18. The second side 22 defines four bosses 26 (See FIG. 4) or protrusions which surround the openings 18. As explained in more detail hereinbelow, when the thermal shield flexure member 10 is used to replace the functionality of one of the thermal shield flexures described above, the first face portion 12 is bolted to the thermal shield by bolts which pass through the respective openings 18 and into corresponding receptacles defined by the thermal shield. The bosses 26 assist with the alignment of the openings 18 with the receptacles defined by the thermal shield during installation of the thermal shield flexure member 10, and also operate to carry shear loads to reduce the stress on the bolts which secure the thermal shield flexure member 10 to the thermal shield.

The second face portion 14 defines a plurality of openings 28 which pass through the second face portion 14, from a first side 30 of the second face portion 14 to a second side 32 (See FIG. 4) of the second face portion 14. Although four of the openings 28 are shown in FIG. 4, according to other aspects, the number of openings 28 can be less than or greater than four. Each of the four openings 28 are countersunk on the first side 30, but the countersinking of the openings 28 may not be as deep as the countersinking of the openings 18. According to various aspects, each of the openings 28 define a recess machined into the sidewall of the opening 28, where the recess is similar or identical to the recess 24 shown in FIG. 8. On the second side 32, each of the openings 28 are configured to receive press-fit bushings 34 (See FIG. 4) which, when installed, are positioned against the second side 32 and surround the openings 28 on the second side 32. According to various aspects, the thermal shield flexure member 10 includes the installed bushings 34.

As explained in more detail hereinbelow, when the thermal shield flexure member 10 is used to replace the functionality of one of the thermal shield flexures described above, the second face portion 14 is bolted to the core barrel by bolts which pass through the respective openings 28 and the corresponding bushings 34, through corresponding openings defined by the core barrel, and into corresponding receptacles defined by the arm portion of the thermal shield flexure. The bushings 34 assist with the alignment of the openings 28 with the openings defined by the core barrel during installation of the thermal shield flexure member 10, and also operate to carry shear loads to reduce the stress on the bolts which secure the thermal shield flexure member 10 to the core barrel (by securing the thermal shield flexure member 10 to the arm portion of the "replaced" thermal shield flexure). The bushings 34 can be machined to custom lengths to better enable the installation of the thermal shield flexure member 10. According to various aspects, the bushings 34 can have a length which allows them to protrude the same distance from second face portion 14 that the bosses 26 protrude from the first face portion 12. According to other aspects, the bushings 34 can have a length which allows them to protrude a greater distance from the second face portion 14 than the bosses 26 protrude from the first face portion 12 (See FIG. 5).

The third portion 16 includes a first radiused portion 40 connected to the first face portion 12, and a second radiused portion 38 connected to the second face portion 14. The third portion 16 also includes a leg portion 36 connected to the first and second radiused portions 38, 40, and operates to absorb axial deflection of the core barrel and/or the thermal shield.

The first and second face portions 12, 14 may be of any suitable size and shape. The third portion 16 may be of any suitable length, thickness and shape. In general, the less material utilized for the third portion 16, the greater the capacity for absorbing the axial deflection. Similarly, the longer the leg portion 36 of the third portion 16, the more the axial flexibility of the thermal shield flexure member 10.

Figure 5:
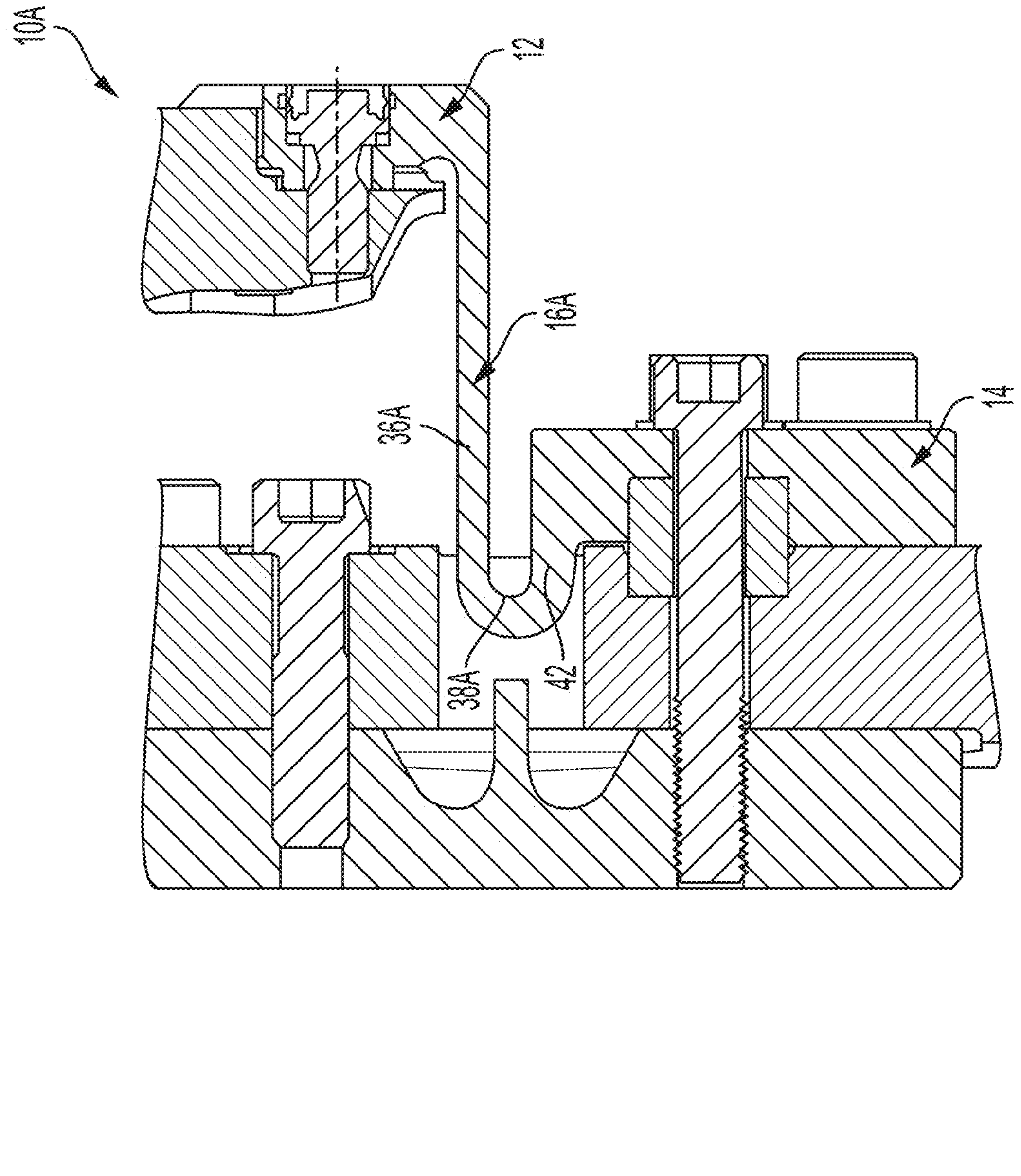
FIG. 5 illustrates another thermal shield flexure member, in accordance with at least one other aspect of the present disclosure.

FIG. 5 illustrates another thermal shield flexure member 10A, in accordance with at least one other aspect of the present disclosure. The thermal shield flexure member 10A is similar to the thermal shield flexure member 10, but is different. The thermal shield flexure member 10A includes the first and second face portions 12, 14 as described above (including the bushings 34) and a third portion 16A connected to the first and second face portions 12, 14. However, the third portion 16A is different from the third portion 16 described above. The third portion 16A includes a first leg portion 36A which is similar or identical to the leg portion 36, a radiused portion 38A which is similar to the radiused portion 38 described above, and a second leg portion 42 which is connected to the radiused portion 38A and to the second face portion 14. Of course, thermal shield flexure members having sizes and shapes different from the exemplary ones shown in FIGS. 3-5 can be utilized as long as they provide functionality similar to the functionality provided the exemplary ones shown in FIGS. 3-5. For purposes of simplicity, the thermal shield flexure member will be described in the context of the thermal shield flexure member 10, although the thermal shield flexure member 10A and other aspects of the thermal shield flexure member are equally applicable.

Figure 6:
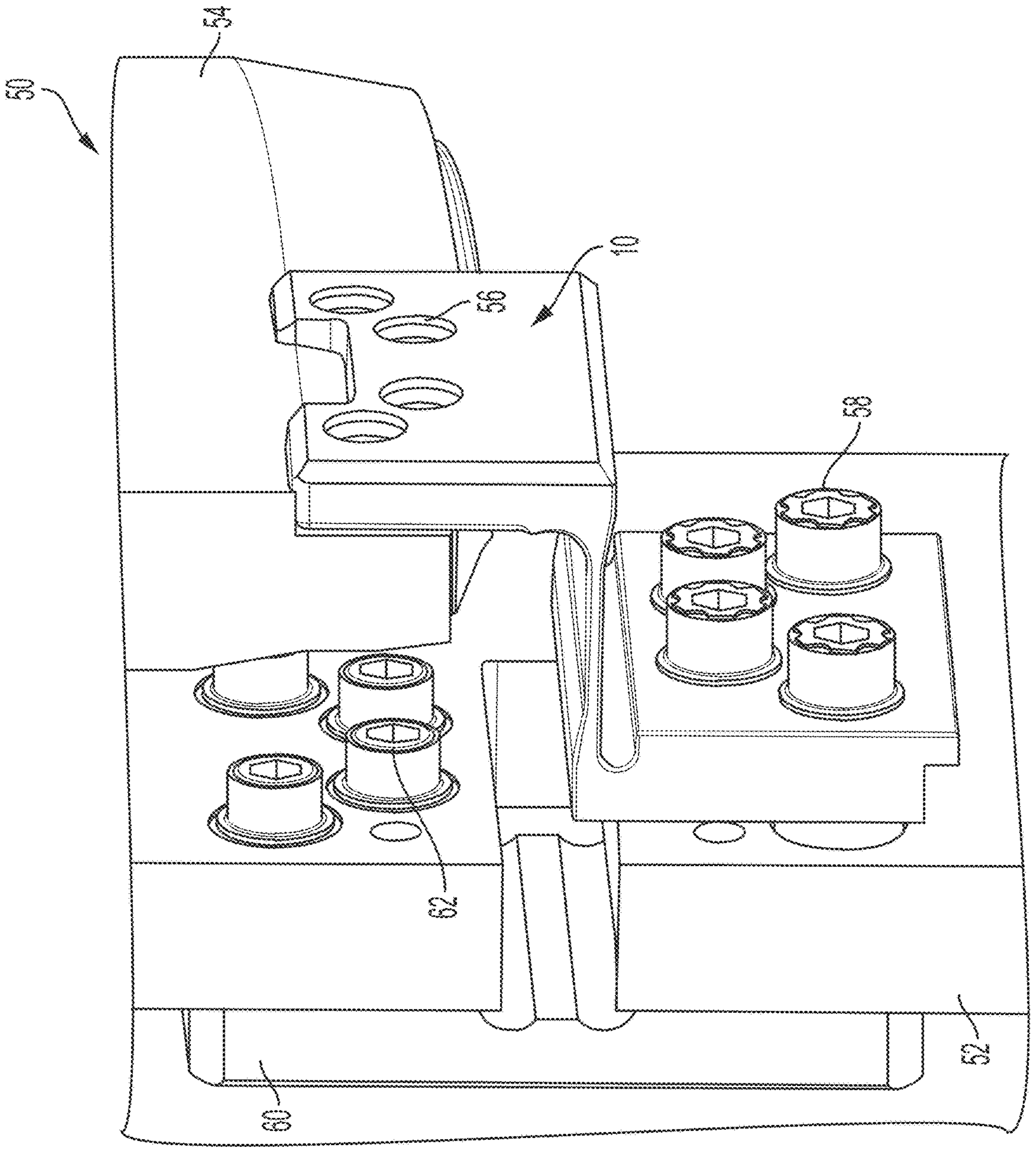
FIG. 6 illustrates a system which includes the thermal shield flexure member of FIG. 3, in accordance with at least one aspect of the present disclosure.

FIG. 6 illustrates a system 50 in accordance with at least one aspect of the present disclosure. Once the thermal shield flexure member 10 is connected to the thermal shield and the core barrel as described above, the thermal shield flexure member 10 may be considered as part of the system 50. The system 50 includes the thermal shield flexure member 10, the core barrel 52, the thermal shield 54, the bolts 56 which connect the thermal shield flexure member 10 to the thermal shield 54, and the bolts 58 which connect the thermal shield flexure member 10 to the core barrel 52 (by securing the thermal shield flexure member 10 to the arm portion of the "replaced" thermal shield flexure). According to various aspects, the system 50 also includes the arm portion 60 of the "replaced" thermal shield flexure and the bolts 62 which connect the arm portion 60 of the "replaced" thermal shield flexure to the core barrel 52.

Figure 7:
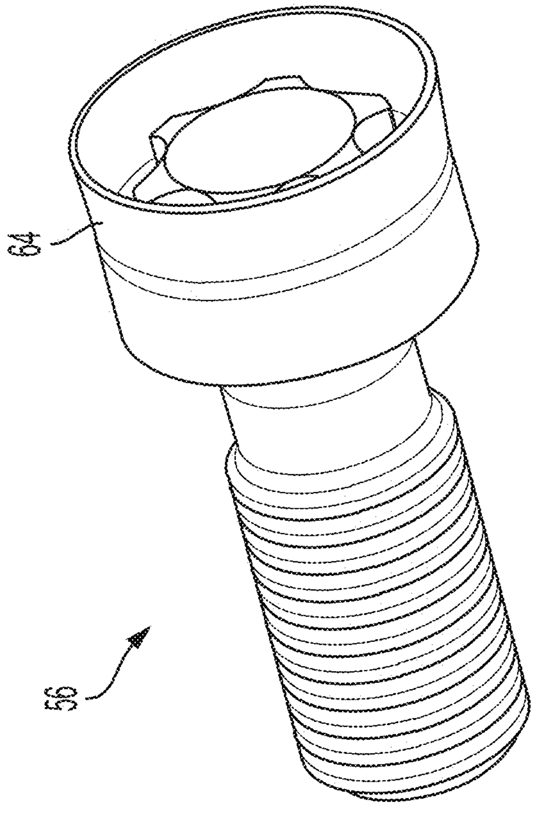
FIG. 7 illustrates a bolt of the system of FIG. 6, in accordance with at least one aspect of the present disclosure.

FIG. 7 illustrates a bolt 56 of the system of FIG. 6, in accordance with at least one aspect of the present disclosure. According to various aspects, the bolts 56 may include an integral locking member 64 which assists in keeping the bolts 56 secured to the thermal shield flexure member 10. According to various aspects, the bolts 56 are similar or identical to those described in U.S. Pat. No. 6,164,886, the content of which is hereby incorporate by reference in its entirety. According to various aspects, the bolts 58 and/or the bolts 62 may also include an integral locking member similar or identical to the integral locking member 64.

Figure 8:
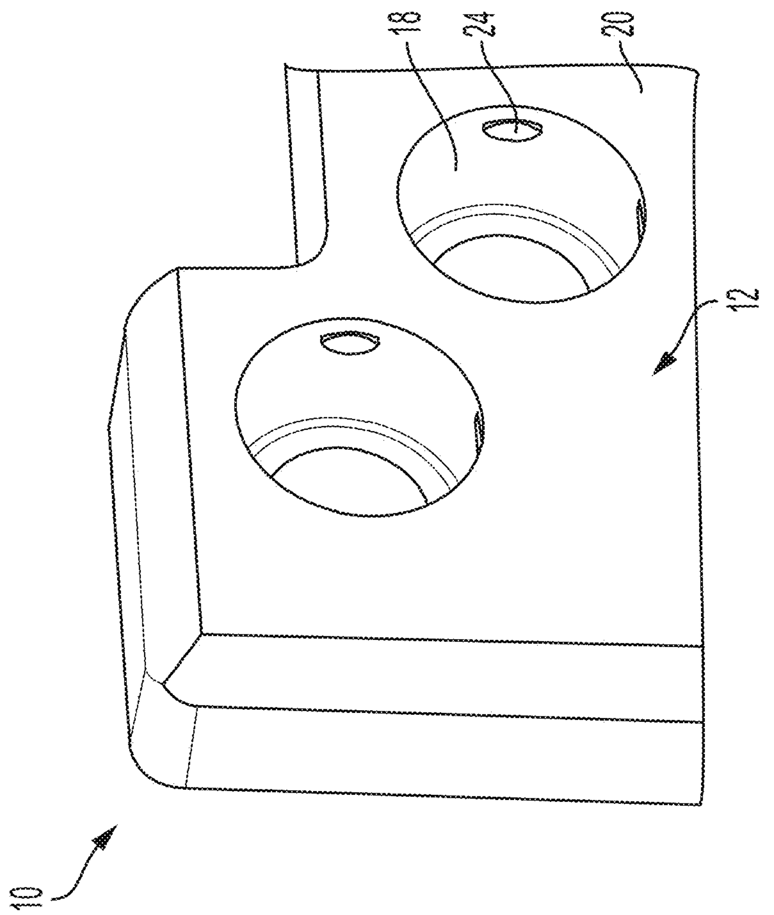
FIG. 8 illustrates a recess defined by an opening of the thermal shield flexure member of FIG. 3, in accordance with at least one aspect of the present disclosure.

FIG. 8 illustrates recesses 24 defined by the openings 18 of the thermal shield flexure member 10, in accordance with at least one aspect of the present disclosure. Each recess 24 is configured to receive the integral locking member 64 of a corresponding one of the bolts 56, and cooperates with the integral locking member 64 to assist in keeping the bolt 56 secured to the thermal shield flexure member 10. Although not shown for purposes of duplicity, according to various aspects, the openings 28 may also define recesses similar or identical to the recesses 24, where each recess is configured to receive the integral locking member 64 of a corresponding one of the bolts 58 to assist in keeping the bolt 58 secured to the thermal shield flexure member 10.

Figure 9:
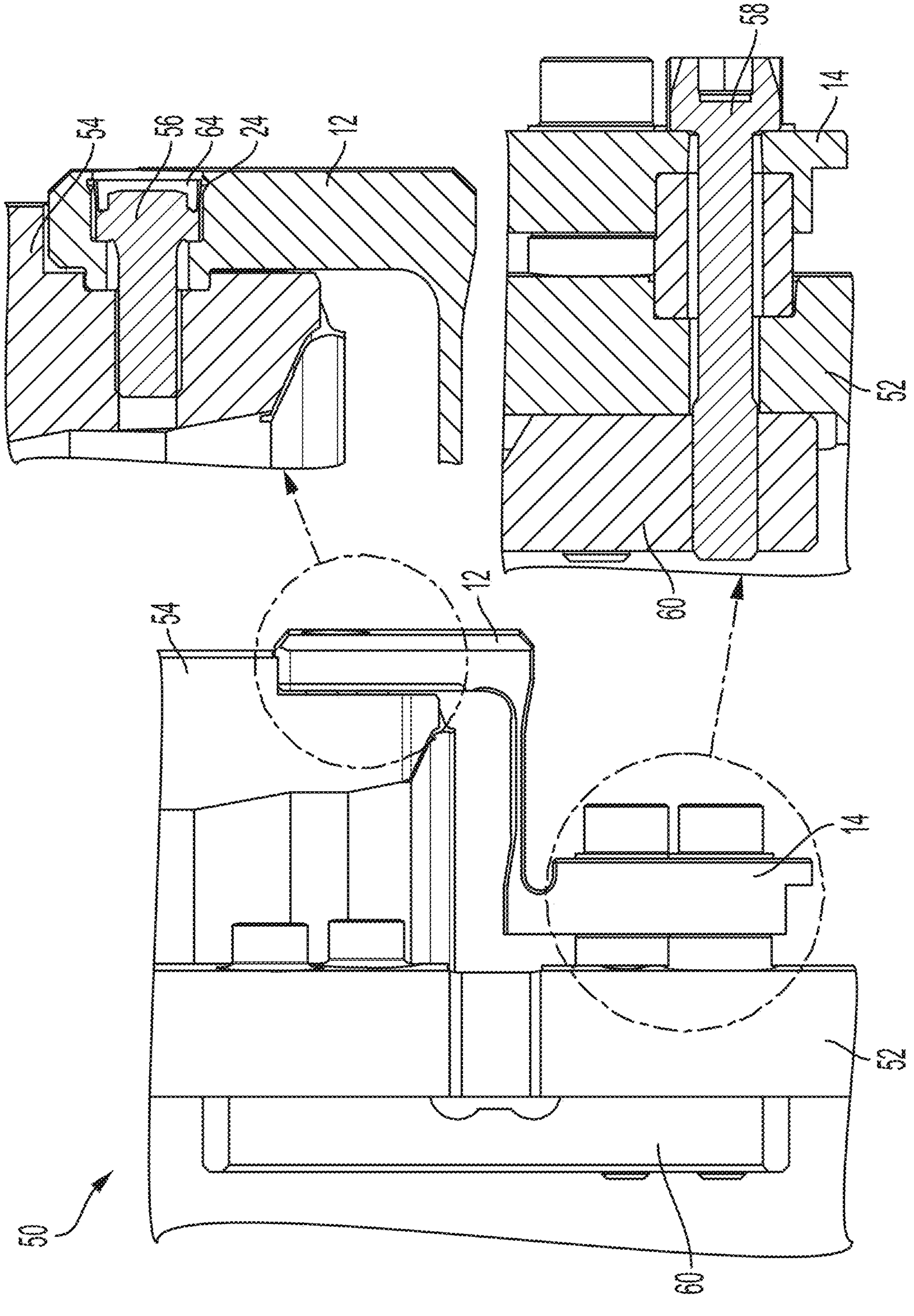
FIG. 9 illustrates a cross section of the system of FIG. 6, in accordance with at least one aspect of the present disclosure.

FIG. 9 illustrates a cross section of the system 50, in accordance with at least one aspect of the present disclosure. The cross-section of the system 50 also shows a cross-section of the thermal shield flexure member 10, where the first face portion 12 of the thermal shield flexure member 10 is shown as being bolted to the thermal shield 54 and the second face portion 14 of the thermal shield flexure member 10 is shown as being bolted to the arm portion 60 of the "replaced" thermal shield flexure. As shown in the exploded cross-section of the connection of the first face portion 12 to the thermal shield 54, the opening 18 includes the recess 24 and the bolt 56 includes the integral locking member 64. As shown in the exploded cross-section of the connection of the second face portion 14 to the arm portion 60 of the "replaced" thermal shield flexure, the bushing 34 at the rear of the second face portion 14 is received by a countersunk opening in the core barrel 52, the bolt 58 is seated in a countersunk opening 28 of the second face portion 14, the bolt 58 extends through the core barrel 52 and is threadedly connected to the arm portion 60 of the "replaced" thermal shield flexure.

Figure 2:
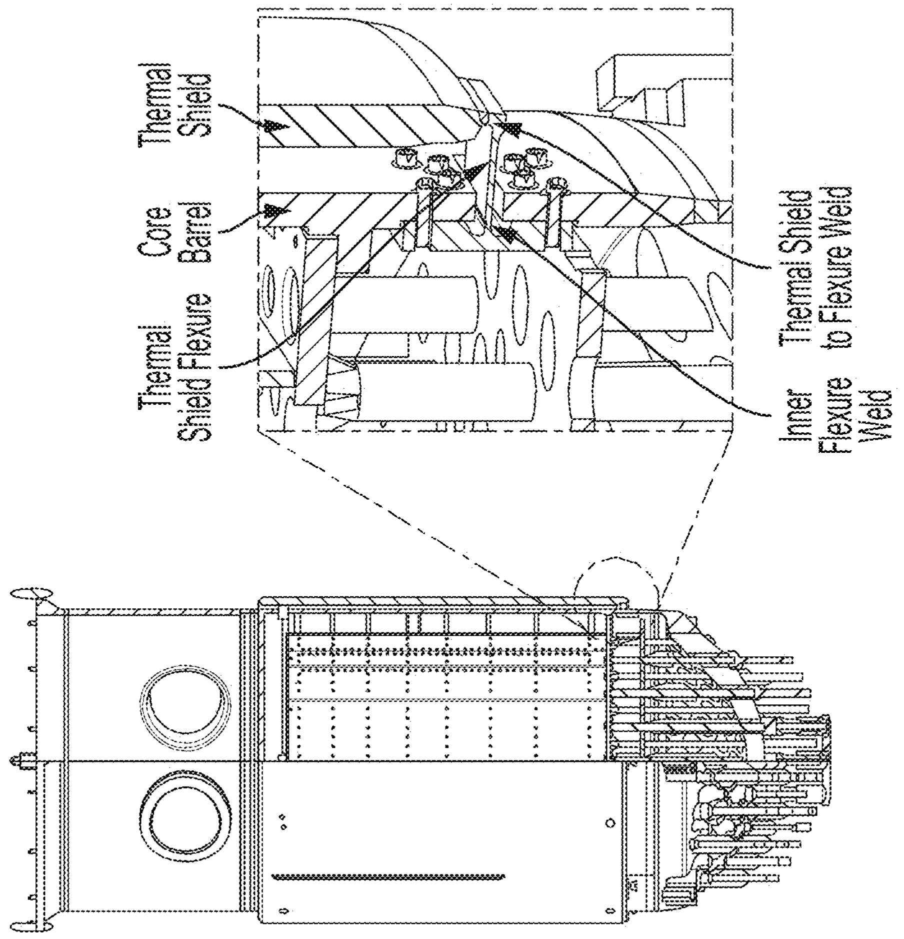
FIG. 2 illustrates an exemplary thermal shield flexure secured to a core barrel and a thermal shield of a reactor vessel.
Figure 10:
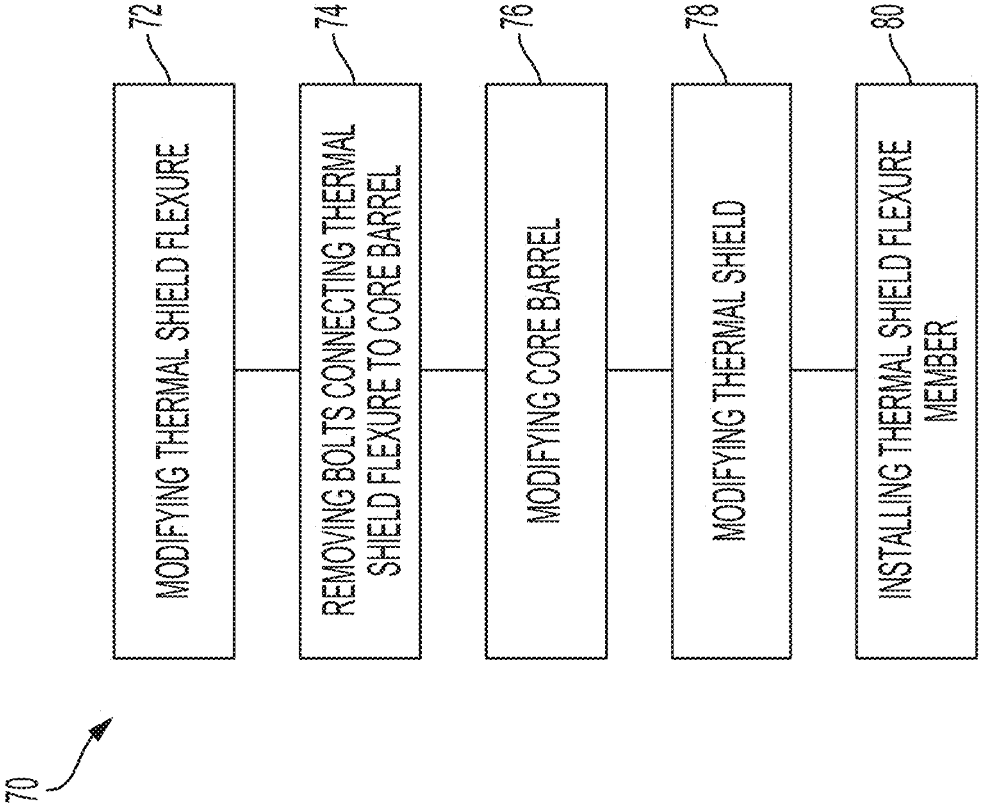
FIG. 10 illustrates a method of replacing a functionality of a thermal shield flexure, in accordance with at least one aspect of the present disclosure.

FIG. 10 illustrates a method 70 of replacing a functionality of a thermal shield flexure, in accordance with at least one aspect of the present disclosure. Prior to the installation of the thermal shield flexure member 10 which replaces the functionality of the "replaced" thermal shield flexure, the thermal shield fixture is modified 70 by removing the stem portion (See FIG. 2) of the thermal shield fixture. The removal of the stem portion can be realized in any suitable manner. For example, according to various aspects, the welded joints connecting the stem portion to the arm portion 60 and/or the thermal shield 54 can be removed by mechanical reversal (e.g., using a grinder or a milling tool) or by thermal reversal such as, for example, electrical discharge milling (EDM). Once the welded joints are removed, the stem portion of the thermal shield flexure can then be removed. Once the stem portion has been removed, the bolts connecting the bottom portion of the arm portion 60 of the modified thermal shield flexure to the core barrel 52 are removed 74. The bolts connecting the top portion of the arm portion 60 of the modified thermal shield flexure to the core barrel 52 remain in place.

Figure 11:
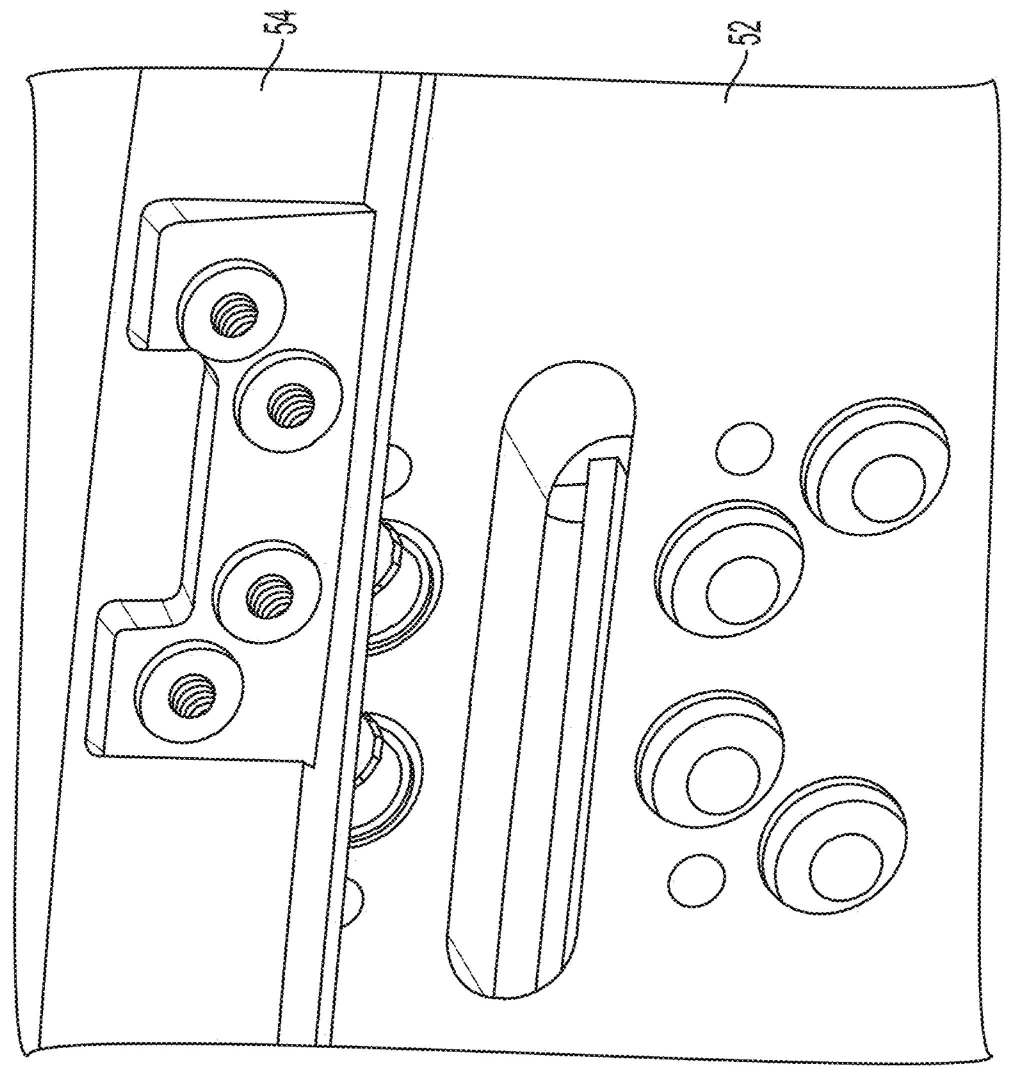
FIG. 11 illustrates exterior surfaces of a thermal shield and a core barrel of the system of FIG. 6 at a step of the method of FIG. 10, in accordance with at least one aspect of the present disclosure.

After the bolts connecting the bottom portion of the arm portion 60 of the modified thermal shield flexure to the core barrel 52 have been removed, the core barrel 52 is modified 76 to accept the thermal shield flexure member 10. Either before, after or concurrently with the modifications to the core barrel 52, the thermal shield 54 is also modified 78 to accept the thermal shield flexure member 10. The modifications may be realized in any suitable manner. For example, according to various aspects, conventional machining (a tapping tool) may be utilized to create new threaded receptacles in the thermal shield 54 to receive the threads of the bolts 56. Conventional machining using milling cutters or EDM may be utilized to countersink the threaded receptacles in the thermal shield 54 (See FIG. 11) to receive the bosses 26 of the first face portion 12, and to create the recesses 24 which receive the integral locking members 64 of the bolts 56. Conventional milling or EDM may also be utilized to countersink the openings in the core barrel 52 (See FIG. 11) to receive the bushings 34 of the second face portion 14. The relative surfaces of the bosses 26 and the bushings 34 of the thermal shield flexure member 10 and the countersunk threaded receptacles of the thermal shield 54 and the countersunk openings in the core barrel 52 can be tightly controlled to ensure the necessary tolerances for installation of the thermal shield flexure member 10 with minimal pre-stress.

After the machining of the thermal shield 54 and the core barrel 52 are completed, the thermal shield flexure member 10 can be installed 80. As set forth above, installation of the thermal shield flexure member 10 includes positioning the thermal shield flexure member 10 so the bosses 26 and the bushings 34 are received by the countersunk threaded receptacles of the thermal shield 54 and the countersunk openings of the core barrel 52. Once the thermal shield flexure member 10 is properly positioned, the bolts 56 are utilized to connect the first face portion 12 to the thermal shield 54 (threads of the bolts 56 are threadedly engaged with the threaded receptacles of the thermal shield 54), and the bolts 58 are utilized to connect the second face portion 14 to the core barrel 52 by threadedly engaging with the arm portion 60 of the modified/"replaced" thermal shield flexure.

In view of the above, it will be appreciated that the configuration of the thermal shield flexure member 10 allows for it to be installed without welding and from the exterior side of the core barrel/exterior side of the thermal shield, without having to access the interior of the core barrel, thereby greatly reducing the cost, outage impact, and installation risk of replacing the thermal shield flexure with a similar or identical thermal shield flexure. It will also be appreciated that openings in the core barrel 52 which originally served to connect the modified/"replaced" thermal shield flexure to the core barrel 52 are reused to connect the thermal shield flexure member 10 to the core barrel 52 (by the bolts 58 connecting the thermal shield flexure member 10 to the arm portion 60 of the modified/"replaced" thermal shield flexure), and no additional openings have to be made through the core barrel 52. The method 70 and the thermal shield flexure member 10 provide a permanent repair for damaged thermal shield flexures regardless of the current extent of damage. The thermal shield flexure member 10 restores the vibratory behavior of the lower internals assembly of the reactor vessel to the design condition by directly replacing the functionality of existing thermal shield flexures with minimal changes to the stiffness characteristics. The system 50 also provides for better access to the bolts 56, 58 and the thermal shield flexure member 10 for future inspections.

EXAMPLES

Example 1—A thermal shield flexure member is provided. The thermal shield flexure member comprises a first face portion, a second face portion and a third portion. The first face portion defines openings configured to align with receptacles of a thermal shield. The second face portion defines openings configured to align with openings of a core barrel and openings of an arm portion of a modified thermal shield flexure connected to the core barrel. The third portion is connected to the first face portion and the second face portion, and comprises a radiused portion. The thermal shield flexure member is configured to provide (1) flexibility in an axial direction to accommodate differential axial expansions of the core barrel and the thermal shield and (2) rigidity in a radial direction to inhibit undesirable shell mode vibrations of the core barrel and/or the thermal shield.

Example 2—The thermal shield flexure of Example 1, wherein the openings defined by the first face portion are countersunk on a first side of the first face portion.

Example 3—The thermal shield flexure of Examples 1 or 2, wherein a sidewall of at least one of the openings defined by the first face portion define at least one recess configured to receive an integral locking member of a bolt.

Example 4—The thermal shield flexure of Examples 1, 2 or 3, wherein the first face portion further defines bosses on a second side of the first face portion.

Example 5—The thermal shield flexure of Example 4, wherein at least one of the bosses surrounds one of the openings defined by the first face portion.

Example 6—The thermal shield flexure of Examples 1, 2, 3, 4 or 5, wherein the openings defined by the second face portion are countersunk on a first side of the second face portion.

Example 7—The thermal shield flexure of Examples 1, 2, 3, 4, 5 or 6, further comprising bushings positioned against a second side of the second face portion.

Example 8—The thermal shield flexure of Example 7, wherein at least one of the bushings surrounds one of the openings defined by the second face portion.

Example 9—The thermal shield flexure of Examples 1, 2, 3, 4, 5, 6, 7 or 8, wherein the third portion further comprises a second radiused portion, and a leg portion connected to the radiused portion and the second radiused portion.

Example 10—The thermal shield flexure of Examples 1, 2, 3, 4, 5, 6, 7 or 8, wherein the third portion further comprises a first leg portion connected to the radiused portion, and a second leg portion connected to the radiused portion.

Example 11—A system is provided. The system comprises a core barrel, a thermal shield, an arm portion of a modified thermal shield flexure and a thermal shield flexure member. The arm portion is positioned interior to and bolted to the core barrel. The thermal shield flexure member is positioned exterior to the core barrel and comprises a first face portion bolted to the thermal shield, a second face portion bolted to the arm portion of the modified thermal shield flexure, and a third portion connected to the first and second face portions, wherein the third portion comprises a radiused portion.

Example 12—The system of Example 11, wherein the thermal shield flexure member further comprises bushings positioned against the second face portion.

Example 13—The system of Examples 11 or 12, wherein the third portion further comprises a first leg portion connected to the first face portion and the radiused portion, and a second leg portion connected to the second face portion and the radiused portion.

Example 14—The system of Examples 11 or 12, wherein the third portion further comprises a second radiused portion connected to the first face portion, and a leg portion connected to the radiused portion and the second radiused portion, wherein the radiused portion is connected to the second face portion.

Example 15—The system of Examples 11, 12, 13 or 14, further comprising a plurality of thermal shield flexure members.

Example 16—The system of Examples 11, 12, 13, 14 or 15, further comprising a plurality of bolts, wherein at least one of the bolts comprises an integral locking member.

Example 17—A method of replacing a functionality of a thermal shield flexure of a pressurized water reactor is provided. The method comprises modifying a thermal shield fixture by removing a stem portion of the thermal shield flexure, wherein the modified thermal shield flexure comprises an arm portion positioned internal to and bolted to a core barrel, removing at least one bolt but less than all bolts connecting the arm portion to the core barrel, modifying the core barrel, modifying a thermal shield positioned exterior to the core barrel, and installing a thermal shield flexure member exterior to the core barrel.

Example 18—The method of Example 17, wherein removing the stem portion of the thermal shield flexure comprises removing at least one welded joint.

Example 19—The method of Examples 17 or 18, wherein modifying the thermal shield comprises creating threaded receptacles in the thermal shield.

Example 20—The method of Examples 17, 18 or 19, wherein installing the thermal shield flexure member comprises bolting the thermal shield flexure member to the thermal shield and to the arm portion of the modified thermal shield flexure.

Although the various aspects of the thermal shield flexure member 10 have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a pressurized water reactor, the general principles of the invention are equally applicable to other types of reactors.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A nuclear reactor thermal shield flexure member, comprising:

a first face portion, wherein the first face portion defines a first set of openings configured to align with receptacles of a thermal shield and wherein the first face portion is configured to mechanically couple to the thermal shield;

a second face portion, wherein the second face portion defines a second set of openings configured to align with openings of a core barrel, wherein the second face portion is configured to mechanically couple to the core barrel; and a third portion comprising a first leg portion connected to the first face portion and the second face portion, wherein the third portion comprises a first radiused element and a second radiused element, wherein the first radiused element is disposed between the first leg portion and the first face portion, wherein the second radiused element is directly connected to the first lea portion and the second face portion, and wherein the thermal shield flexure member is configured to provide:

flexibility in an axial direction to accommodate differential axial expansions of the core barrel and the thermal shield; and rigidity in a radial direction to inhibit shell mode vibrations of at least one of the core barrel and the thermal shield.

2. The thermal shield flexure member of claim 1, wherein the first set of openings defined by the first face portion are countersunk on a first side of the first face portion.

3. The thermal shield flexure member of claim 1, wherein a sidewall of at least one of the first set of openings defined by the first face portion defines at least one recess configured to receive an integral locking member of a bolt.

4. The thermal shield flexure member of claim 1, wherein the first face portion further defines bosses on a second side of the first face portion.

5. The thermal shield flexure member of claim 4, wherein at least one of the bosses surrounds one of the first set of openings defined by the first face portion.

6. The thermal shield flexure member of claim 1, wherein the second set of openings defined by the second face portion are countersunk on a first side of the second face portion.

7. The thermal shield flexure member of claim 1, further comprising bushings positioned against a second side of the second face portion.

8. The thermal shield flexure member of claim 7, wherein at least one of the bushings surrounds one of the second set of openings defined by the second face portion.

* * * * *